United States Patent
Zhang et al.

(10) Patent No.: US 11,926,935 B2
(45) Date of Patent: Mar. 12, 2024

(54) AUTOMATIC YARN FEEDING SYSTEM FOR TWISTING MACHINE

(71) Applicant: YICHANG JINGWEI TEXTILE MACHINERY CO., LTD., Hubei (CN)

(72) Inventors: Pihua Zhang, Hubei (CN); Ming Xiao, Hubei (CN); Yongming Li, Hubei (CN); Haibo Jiang, Hubei (CN); Ming Zhang, Hubei (CN); Huanian Yang, Hubei (CN)

(73) Assignee: YICHANG JINGWEI TEXTILE MACHINERY CO., LTD. (CN)

( * ) Notice: Subject to any disclaimer, the term of this patent is extended or adjusted under 35 U.S.C. 154(b) by 533 days.

(21) Appl. No.: 17/033,861

(22) Filed: Sep. 27, 2020

(65) Prior Publication Data

US 2022/0074084 A1 Mar. 10, 2022

(30) Foreign Application Priority Data

Sep. 4, 2020 (CN) .......................... 202010923926.3

(51) Int. Cl.
*D01H 9/18* (2006.01)
*B25J 9/00* (2006.01)
(Continued)

(52) U.S. Cl.
CPC .............. *D01H 9/18* (2013.01); *B25J 9/0093* (2013.01); *B65H 67/065* (2013.01); *D01H 1/18* (2013.01)

(58) Field of Classification Search
CPC .. D01H 9/00; D01H 9/02; D01H 9/04; D01H 9/08; D01H 9/10; D01H 9/18; D01H 9/182; D01H 1/18; B25J 9/0093; B25J 5/007; B25J 5/02; B25J 15/0052; B25J 11/00; B65H 67/02; B65H 67/065; B65H 67/067; B65H 54/26
(Continued)

(56) References Cited

U.S. PATENT DOCUMENTS 1,669,769 A * 5/1928 Miller ....................... D01H 9/10
57/268
3,429,115 A * 2/1969 Purdy ....................... D07B 7/16
57/59
(Continued)

FOREIGN PATENT DOCUMENTS

CN 109355745 A 2/2019
CN 110485006 A 11/2019
(Continued)

*Primary Examiner* — Grace Huang

(57) ABSTRACT

An automatic yarn feeding system is provided. The system comprises a yarn feeding track which is arranged on the twisting machine in a length direction of the twisting machine and provided with a yarn feeding manipulator walking along the yarn feeding track; and a supply zone which is arranged on one side of the yarn feeding track and used to buffer base yarns. The yarn feeding manipulator is used to convey the base yarns from the supply zone to a yarn feeding creel of each spindle position. The yarn feeding track is located in the middle of the top of the twisting machine. The supply zone is provided with a structure for buffering a plurality of base yarns, and is located on one side of an end of the yarn feeding track on the top of a control cabinet.

18 Claims, 13 Drawing Sheets

(51) Int. Cl.
   *B65H 67/06* (2006.01)
   *D01H 1/18* (2006.01)
(58) Field of Classification Search
   USPC .................................. 57/266, 270, 271, 281
   See application file for complete search history.

(56) References Cited

U.S. PATENT DOCUMENTS

| | | | | | |
|---|---|---|---|---|---|
| 3,830,049 | A | * | 8/1974 | Kieronski | D01H 9/10 242/473.9 |
| 3,854,275 | A | * | 12/1974 | Bethea | B65H 67/065 57/276 |
| 4,081,949 | A | * | 4/1978 | Keller | D01H 9/10 57/264 |
| 4,555,067 | A | * | 11/1985 | Angelucci | B65H 54/26 414/222.09 |
| 4,565,278 | A | * | 1/1986 | Asai | B65G 47/24 198/409 |
| 4,582,270 | A | * | 4/1986 | Asai | B65H 67/064 242/473.6 |
| 4,591,106 | A | * | 5/1986 | Gay | B65H 67/0411 57/274 |
| 4,771,597 | A | * | 9/1988 | Igel | D01H 9/005 57/264 |
| 5,003,762 | A | * | 4/1991 | Scaglia | B65H 67/063 242/472.1 |
| 5,219,264 | A | * | 6/1993 | McClure | G06T 1/0014 414/730 |
| 5,230,209 | A | * | 7/1993 | Hirai | D01H 9/18 57/90 |
| 5,459,990 | A | * | 10/1995 | Tsuzuki | B65H 67/064 19/145.5 |
| 6,260,783 | B1 | * | 7/2001 | Realff | B65H 67/063 294/98.1 |
| 10,793,301 | B2 | * | 10/2020 | Kawano | B65H 35/006 |
| 11,007,648 | B2 | * | 5/2021 | Wertenberger | B25J 9/1697 |
| 11,060,210 | B2 | * | 7/2021 | Doerner | D01H 9/10 |
| 2011/0274232 | A1 | * | 11/2011 | Doll | B25J 5/02 104/2 |
| 2020/0189860 | A1 | * | 6/2020 | Brakensiek | D01H 9/18 |
| 2022/0241971 | A1 | * | 8/2022 | Bell | B25J 9/0093 |

FOREIGN PATENT DOCUMENTS

| | | | | |
|---|---|---|---|---|
| CN | 114000232 | A | * | 2/2022 |
| JP | 61215725 | A | * | 9/1986 |
| JP | 61277566 | A | * | 12/1986 |
| JP | 05106127 | A | * | 4/1993 |
| JP | 07324290 | A | * | 12/1995 |

* cited by examiner

AUTOMATIC YARN FEEDING SYSTEM FOR TWISTING MACHINE

FIELD

The present invention relates to the field of twisting machines, and more particularly, to an automatic yarn feeding system for a twisting machine.

BACKGROUND

Twisting equipment, such as a tyre cord or a carpet yarn adopts two- or multi-stranded twisting technology. In order to increase productivity and save space, an outer yarn is usually placed on a creel above the equipment. However, original yarn packages of cords and carpet yarns are relatively heavy, generally in a weight of 5-15 kg. In addition, an individual twisting machine has a large number of stations, so the yarn feeding operation brings heavy physical labor to an operator. Further, in the twisting production, the production efficiency needs to be guaranteed for the continuous yarn supply to the twisting machine, so as to avoid the termination of spinning caused by the replacement of an original yarn package, which will affect the production efficiency. Therefore, in order to reduce the labor intensity of the operator, and also ensure continuous spinning and improve production efficiency, such automatic yarn feeding system suitable for a creel of a multi-station twisting machine is designed.

The patent application CN110485006A discloses an intelligent filament feeding system for a twisting machine robot. The robot is used to feed yarns by walking on the ground, such that automatic feeding of yarns on a twisting station can be satisfied in conjunction with positioning with a navigation and vision technology. Therefore, the cost is low. Another patent document CN109355745A discloses a clamping device and method for a winding bobbin of a two-for-one twister, wherein a robot removes a twisted and wound package and places it on a creel trolley which needs to be moved manually. The prior art has the disadvantages in that: there is no data interaction between the robot and the twisting machine, thereby lacking an overall scheduling and control system; the yarn feeding must be done after the doffing and stop of the twisting machine, and the yarns can only be fed on the outer side of the creel, resulting in low intelligence and automation.

SUMMARY

The technical problem to be solved by the present invention is to provide an automatic yarn feeding system for a twisting machine, which can realize an intelligent yarn feeding operation, thereby greatly improving the operation efficiency, speeding up yarn feeding, reducing the number of expensive equipment such as a yarn feeding trolley, and reducing the labor intensity and manual operations.

In order to solve the above technical problem, the technical solution used by the present invention is: an automatic yarn feeding system for a twisting machine, comprising a yarn feeding track arranged on the twisting machine, wherein the yarn feeding track is arranged in a length direction of the twisting machine and provided with a yarn feeding manipulator walking along the yarn feeding track; and a supply zone which is arranged on one side of the yarn feeding track and used to buffer base yarns, wherein the yarn feeding manipulator is used to convey the base yarns from the supply zone to a yarn feeding creel of each spindle position.

In a preferred solution, the yarn feeding track is located in the middle of the top of the twisting machine; and the supply zone is provided with a structure for buffering a plurality of base yarns, and is located on one side of an end of the yarn feeding track on the top of a control cabinet.

In a preferred solution, further comprising a yarn supply trolley, wherein an omnidirectional self-propelled base is arranged at the bottom of the yarn supply trolley; a yarn supply mechanical arm is arranged at the top of the yarn supply trolley; a camera is arranged on the yarn supply mechanical arm; and the yarn supply trolley is used to load the base yarns to the supply zone.

In a preferred solution, a first manipulator and a second manipulator are arranged at an end of the mechanical arm and used to take off bobbins while feeding the yarns, or take off a plurality of bobbins at the same time.

In a preferred solution, further comprising a sky track on which a transport trolley is arranged, wherein a mechanical arm is arranged on the transport trolley and used to load the base yarns on the transport trolley to the supply zone.

In a preferred solution, the yarn feeding manipulator is structurally characterized in that: a walking trolley is slidably connected to the yarn feeding track; a driving device is arranged on the yarn feeding track and used to drive the walking trolley to walk along the yarn feeding track;

the driving device is a rotating synchronous belt driving device, a fixed synchronous belt driving device or a rack and pinion driving device;

a lifting base is connected to the walking trolley through a first lifting mechanism, and the first lifting mechanism is an air cylinder or a screw nut mechanism for driving the lifting base to move vertically;

an end of the lifting base away from the walking trolley is hinged with a claw seat, and the lifting base is connected to the claw seat through a deflection cylinder, so as to drive the claw seat to deflect along a horizontal line; and a mechanical claw is connected to the claw seat through a claw lifting cylinder to drive the mechanical claw to move up and down in a height direction of driving the claw seat.

In an optional solution, the rotating synchronous belt driving device is characterized in that: a trolley motor fixed on the yarn feeding track drives a synchronous belt to rotate, and the synchronous belt drives the walking trolley to walk; an output shaft of the trolley motor or a motor transmission mechanism is provided with a sensor for detecting a motor speed, so as to detect a position of the walking trolley.

In an optional solution, the fixed synchronous belt driving device is characterized in that the synchronous belt is fixedly mounted on the yarn feeding track, and a driving wheel driven by the trolley motor is arranged on the walking trolley and is engaged with the synchronous belt, thereby driving the walking trolley to walk; and the output shaft of the trolley motor or the driving wheel is provided with a sensor for detecting the motor speed, so as to detect the position of the walking trolley.

In an optional solution, the rack and pinion driving device is characterized in that: a rack is fixed on the yarn feeding track; a gear driven by the trolley motor is arranged on the walking trolley; the gear is engaged with the rack, thereby driving the walking trolley to walk; the output shaft of the trolley motor or the motor transmission mechanism is provided with a sensor for detecting the motor speed, so as to detect the position of the walking trolley.

In a preferred solution, the yarn feeding creel is structurally characterized in that: a rotating frame is connected to an end of the yarn feeding creel through a rotating shaft; the rotating shaft is fixedly connected to the rotating frame; the rotating shaft is also connected to a switching motor through a transmission mechanism, to drive the rotating frame to automatically rotate; and one end of the rotating frame close to the inner side is a spare spinning position, and the other end of the rotating frame is a spinning position.

In a preferred solution, a yarn storage seat is arranged obliquely above the spare spinning position of the yarn feeding creel, and the yarn storage seat is closer to the yarn feeding manipulator than the spare spinning position;
 the yarn storage box is slidably connected to the yarn storage seat through a yarn feeding guide rail, and is driven to move vertically by a yarn storage box lifting cylinder; a yarn storage box is used to store the base yarns; a lower limit position of the yarn storage box is located above the spare spinning position;
 a gate which is opened and closed under the driving of a gate cylinder is arranged at the bottom of the yarn storage box; and when the gate is opened, the base yarns fall into the spare spinning position.

In a preferred solution, a yarn storage seat is arranged obliquely above the spare spinning position of the yarn feeding creel, and the yarn storage seat is closer to the yarn feeding manipulator than the spare spinning position;
 the yarn storage box is slidably connected to the yarn storage seat through a yarn feeding guide rail, and is driven to move vertically by a yarn storage box lifting cylinder; a yarn storage box is used to store the base yarns; a lower limit position of the yarn storage box is located above the spare spinning position;
 a side wall of the yarn storage box adopts an elastic structure, such that the side wall of the yarn storage box is contracted enough to clamp the base yarns; an unwinding cylinder is arranged between the side walls of the yarn storage box to adjust a distance between the side walls of the yarn storage box on both sides.

In a preferred solution, the yarn feeding creel is structurally characterized in that: the rotating frame is pivotally connected to an end of the yarn feeding creel through the rotating shaft; one end of the rotating frame close to the inner side is a spare spinning position, and the other end of the rotating frame is a spinning position.

In a preferred solution, a yarn storage seat is arranged obliquely above the spare spinning position of the yarn feeding creel, and the yarn storage seat is closer to the yarn feeding manipulator than the spare spinning position;
 the yarn storage box is slidably connected to the yarn storage seat through a yarn feeding guide rail, and is driven to move vertically by a yarn storage box lifting cylinder; a yarn storage box is used to store the base yarns; a lower limit position of the yarn storage box is located above the spare spinning position;
 a gate which is opened and closed under the driving of a gate cylinder is arranged at the bottom of the yarn storage box; and when the gate is opened, the base yarns fall into the spare spinning position.

In a preferred solution, a yarn storage seat is arranged obliquely above the spare spinning position of the yarn feeding creel, and the yarn storage seat is closer to the yarn feeding manipulator than the spare spinning position;
 the yarn storage box is slidably connected to the yarn storage seat through a yarn feeding guide rail, and is driven to move vertically by a yarn storage box lifting cylinder; a yarn storage box is used to store the base yarns; a lower limit position of the yarn storage box is located above the spare spinning position;
 a side wall of the yarn storage box adopts an elastic structure, such that a side wall of the yarn storage box is contracted enough to clamp the base yarns; an unwinding cylinder is arranged between the side walls of the yarn storage box to adjust a distance between the side walls of the yarn storage box on both sides.

In a preferred solution, a limiting device is arranged between the yarn feeding creel and the rotating frame to limit a rotation angle of the rotating frame to 180°; and the limiting device is a bull's eye spring limiting device.

In a preferred solution, a position sensor is arranged on the yarn feeding creel at each spindle position, and used to detect a position of the yarn feeding manipulator.

In a preferred solution, the supply zone is structurally characterized in that: side plates are arranged on both sides of the supply zone; a conveying belt is arranged at the bottom of the supply zone; a buffering position is provided at the tail of the conveying belt; a slope is arranged between the buffering position and the tail of the conveying belt, so that the base yarns are vertically located on the buffering position; a buffer position sensor is provided at the buffering position to detect whether the buffering position has the base yarns; and a supply zone sensor is arranged at the tail of the supply zone.

In a preferred solution, the supply zone is structurally characterized in that: side plates are arranged at both sides of the supply zone; a bottom plate is arranged at the bottom of the supply zone; the supply zone is arranged obliquely;
 the side plate at the tail of the supply zone is provided with an open yarn take-out port for allowing the base yarns to be taken out; the side plate at the open yarn take-out port is provided with a yarn take-out sensor for detecting whether the base yarns exist at the open yarn take-out port;
 a head-up push plate is arranged on the bottom plate at the yarn take-out port; the head-up push plate is connected to a head-up cylinder; the head-up cylinder is connected to the head-up push plate; the head-up push plate is located near one end of the open yarn take-out port; and the lifting of the head-up push plate is used to tilt one end of the base yarn close to the open yarn take-out port upward.

A yarn feeding creel for a twisting machine is provided, wherein a rotating frame is pivotally connected to an end of the yarn feeding creel;
 a yarn storage seat is arranged obliquely above a spare spinning position of the yarn feeding creel, and the yarn storage seat is closer to a yarn feeding manipulator than the spare spinning position;
 the yarn storage box is slidably connected to the yarn storage seat through a yarn feeding guide rail, and is driven to move vertically by a yarn storage box lifting cylinder; a yarn storage box is used to store base yarns; a lower limit position of the yarn storage box is located above the spare spinning position;
 a gate which is opened and closed under the driving of a gate cylinder is arranged at the bottom of the yarn storage box, and the base yarns fall in the spare spinning position when the gate is opened; or a side wall of the yarn storage box adopts an elastic structure, such that the side wall of the yarn storage box is contracted enough to clamp the base yarns; an unwinding cylinder is arranged between the side walls of the yarn storage box to adjust a distance between the side walls of the yarn storage box on both sides.

The present invention provides an automatic yarn feeding system for a twisting machine. Intelligent and segmented feeding of yarns can be achieved by using the structure of a supply zone in conjunction with the yarn feeding manipulator located on the twisting machine and the rotatable yarn feeding creel. The yarns fed by a yarn supply trolley only need to be conveyed to a buffer zone, and the base yarns are conveyed to each yarn feeding creel through the yarn feeding manipulator, thereby improving the efficiency of automatic yarn feeding. In the preferred solution, the solution of arranging a transport trolley on a sky track to transport the base yarns can reduce the occupation on the ground and increase the utilization rate of a site. The yarn feeding creel with the yarn storage seat can reduce a distance from the yarn feeding position to the yarn feeding manipulator, so that a small-sized yarn feeding manipulator can be used.

BRIEF DESCRIPTION OF THE DRAWINGS

A further description will be given below with reference to the drawings and embodiments.

Figure 1:
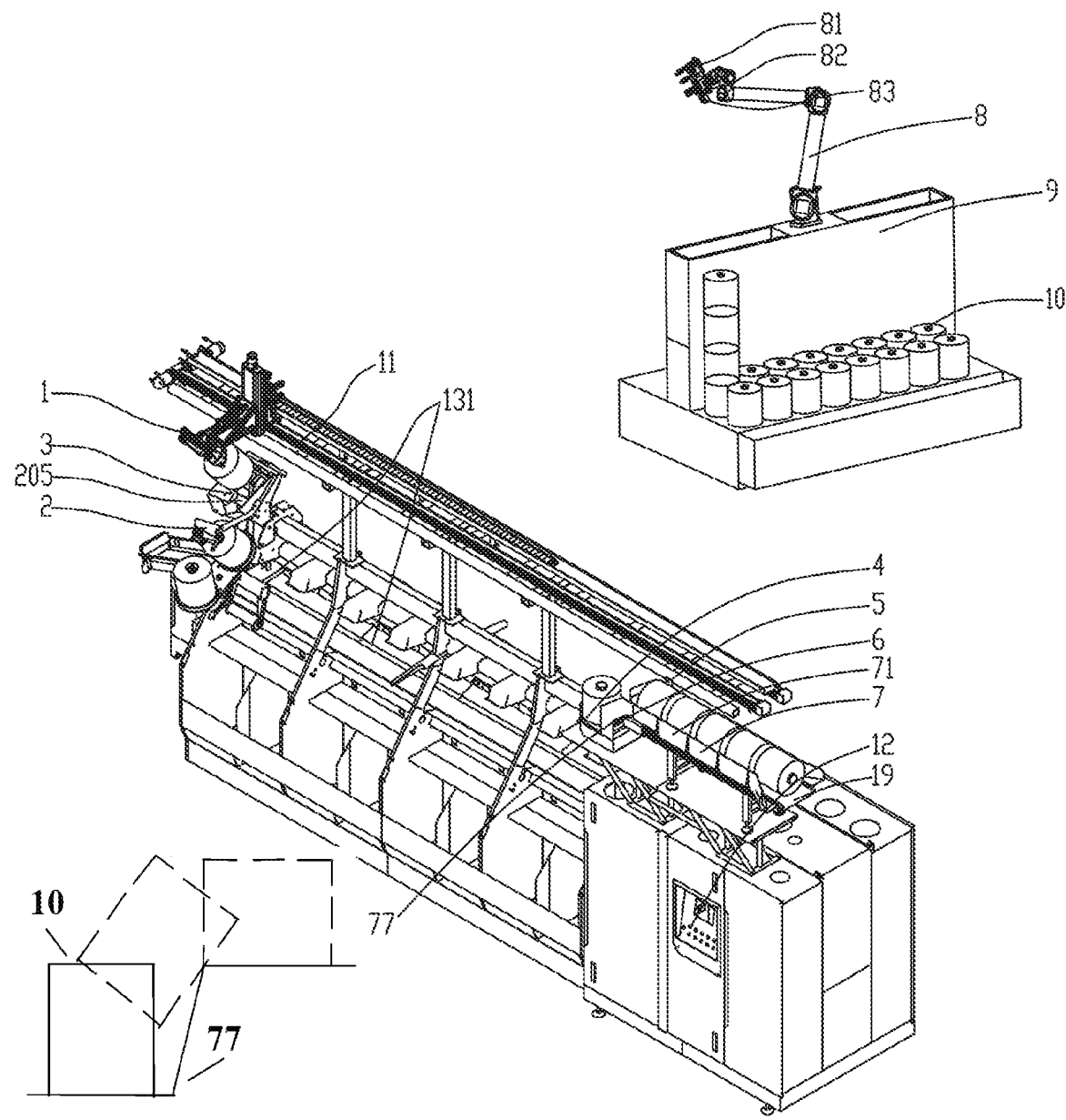
FIG. 1 is a schematic diagram of the overall structure of a yarn feeding system of the present invention.

In drawings, reference symbols represent the following components: yarn feeding manipulator 1, walking trolley 101, first lifting mechanism 102, lifting base 103, deflection cylinder 104, claw seat 105, claw lifting cylinder 106, mechanical claw 107, trolley motor 108, driving wheel 109, sensor 110 for detecting a motor speed, synchronous belt 111, rack 112, gear 113, yarn feeding creel 2, yarn storage box lifting, cylinder 20, yarn storage box 21, yarn feeding guide rail 22, yarn storage seat 23, rotating frame 24, spinning position 25, limiting device 26, gate cylinder 27, unwinding cylinder 28, spare spinning position 29, rotating shaft 201, creel mounting base 202, switching motor 203, transmission mechanism 204, gate 205, side wall 206, position sensor 3, buffering position 4, supply zone sensor 5, buffering position sensor 6, supply area 7, open yarn take-out port 71, head-up push plate 72, head-up cylinder 73, side plate 74, bottom plate 75, yarn take-out sensor 76, yarn supply mechanical arm 8, first manipulator 81, second manipulator 82, camera 83, yarn supply trolley 9, doffing port 91, partition box 92, omnidirectional self-propelled base 93, base yarn 10, yarn feeding track 11, control cabinet 12, twisting machine 13, spindle position 131, industrial control server 14, wireless controller 15, sky track 16, conveying/transport trolley 17, mechanical arm 18, conveying belt 19.

DETAILED DESCRIPTION

As shown in FIG. 1, an automatic yarn feeding system for a twisting machine, comprising a yarn feeding track 11 arranged on the twisting machine 13, wherein the yarn feeding track 11 is arranged in a length direction of the twisting machine 13 and provided with a yarn feeding manipulator 1 walking along the yarn feeding track 11; and a supply zone 7 which is arranged on one side of the yarn feeding track 11 and used to buffer base yarns 10, wherein the yarn feeding manipulator 1 is used to convey the base yarns from the supply zone 7 to a yarn feeding creel 2 of each spindle position 131. With this structure, each twisting machine can automatically transport base yarns 10 to each spindle position, thereby improving the yarn feeding efficiency and reducing the time occupied by a yarn supply trolley or other conveying equipment. The equipment efficiency of the entire workshop is improved.

In preferred solutions shown in FIG. 1, the yarn feeding track 11 is located in the middle of the top of the twisting machine 13; and the supply zone 7 is provided with a structure for buffering a plurality of base yarns 10, and is located on one side of an end of the yarn feeding track 11 on the top of a control cabinet 12. With this structure, a structure of a yarn feeding system can be made more compact.

In preferred solutions shown in FIGS. 1, 6, 7, 8, and 9, a yarn supply trolley 9 is also provided. An omni-directional self-propelled base 93 is arranged at the bottom of the yarn supply trolley 9. The omni-directional self-propelled base can automatically operate in a factory area according to instructions of an industrial control server 14. A yarn supply mechanical arm 8 is arranged on the top of the yarn supply trolley 9. A camera 83 is arranged on the yarn supply mechanical arm 8 to identify and locate the position of a manipulator. The yarn supply trolley 9 is used to load the base yarns 10 to a supply zone 7. A doffing port 91 is formed in the yarn supply trolley 9 and used for storing bobbins. A partition box 92 is also arranged on one side of the yarn supply trolley 9 and used for storing partitions.

Figure 8:
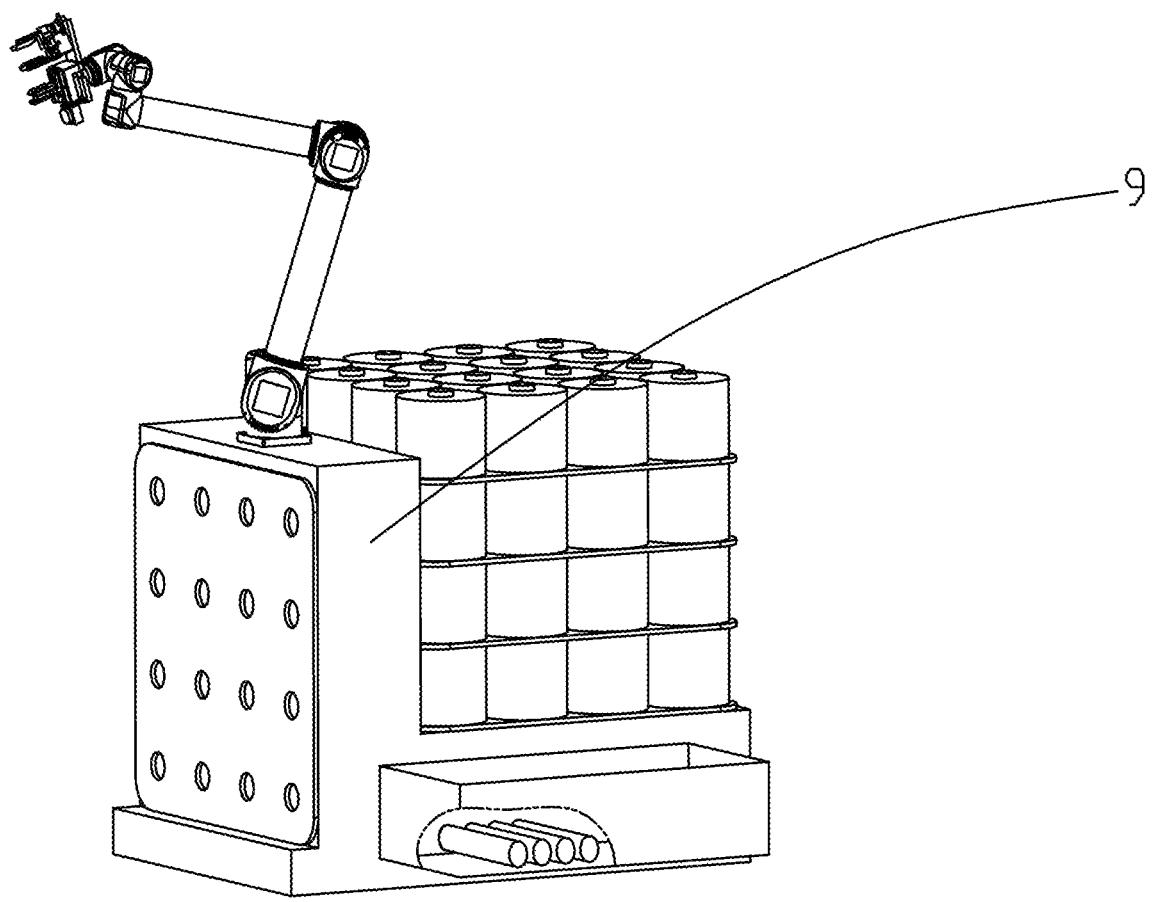
FIG. 8 is a stereogram of the yarn supply trolley of the present invention.
Figure 9:
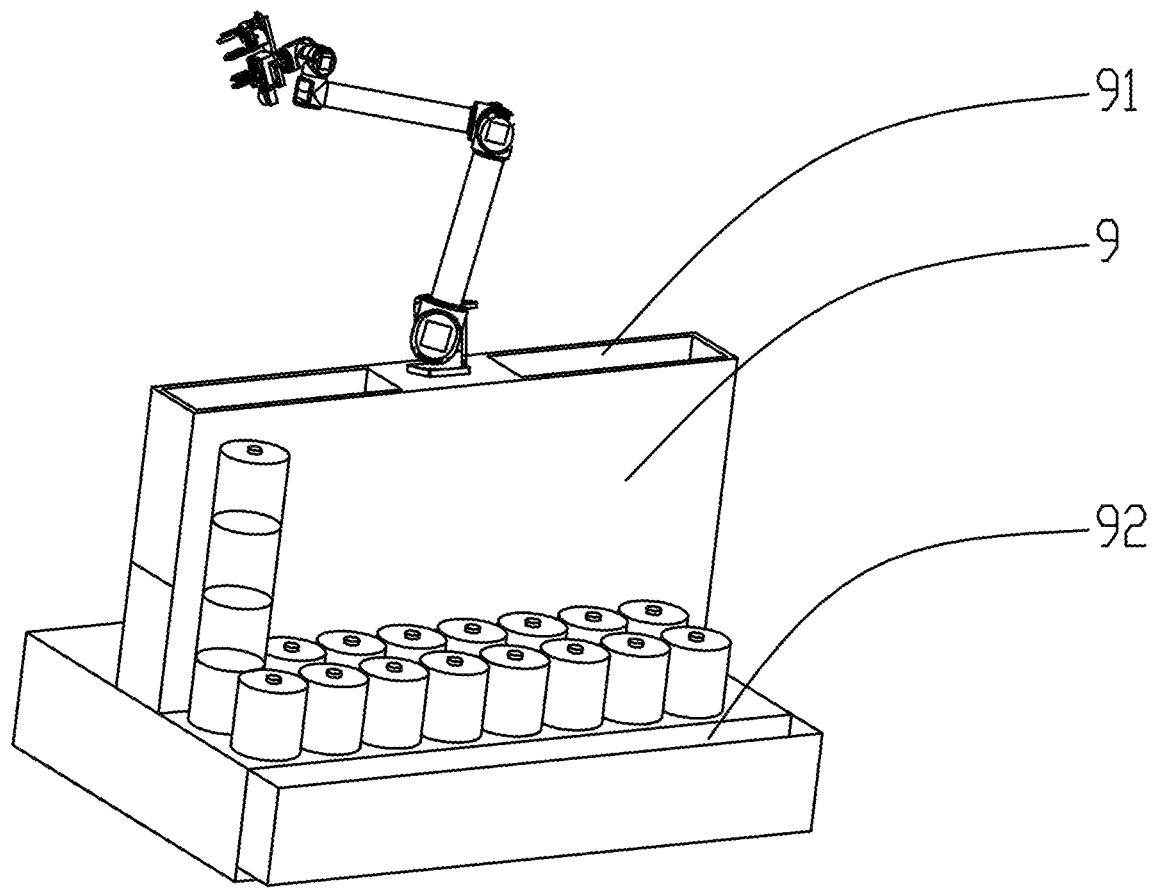
FIG. 9 is a stereogram of another preferred structure of the yarn supply trolley of the present invention.

In preferred solutions shown in FIGS. 8, and 9, a first manipulator 81 and a second manipulator 82 are arranged at an end of the mechanical arm 8 and used to take off bobbins while feeding the yarns, or take off a plurality of bobbins at the same time.

Figure 11:
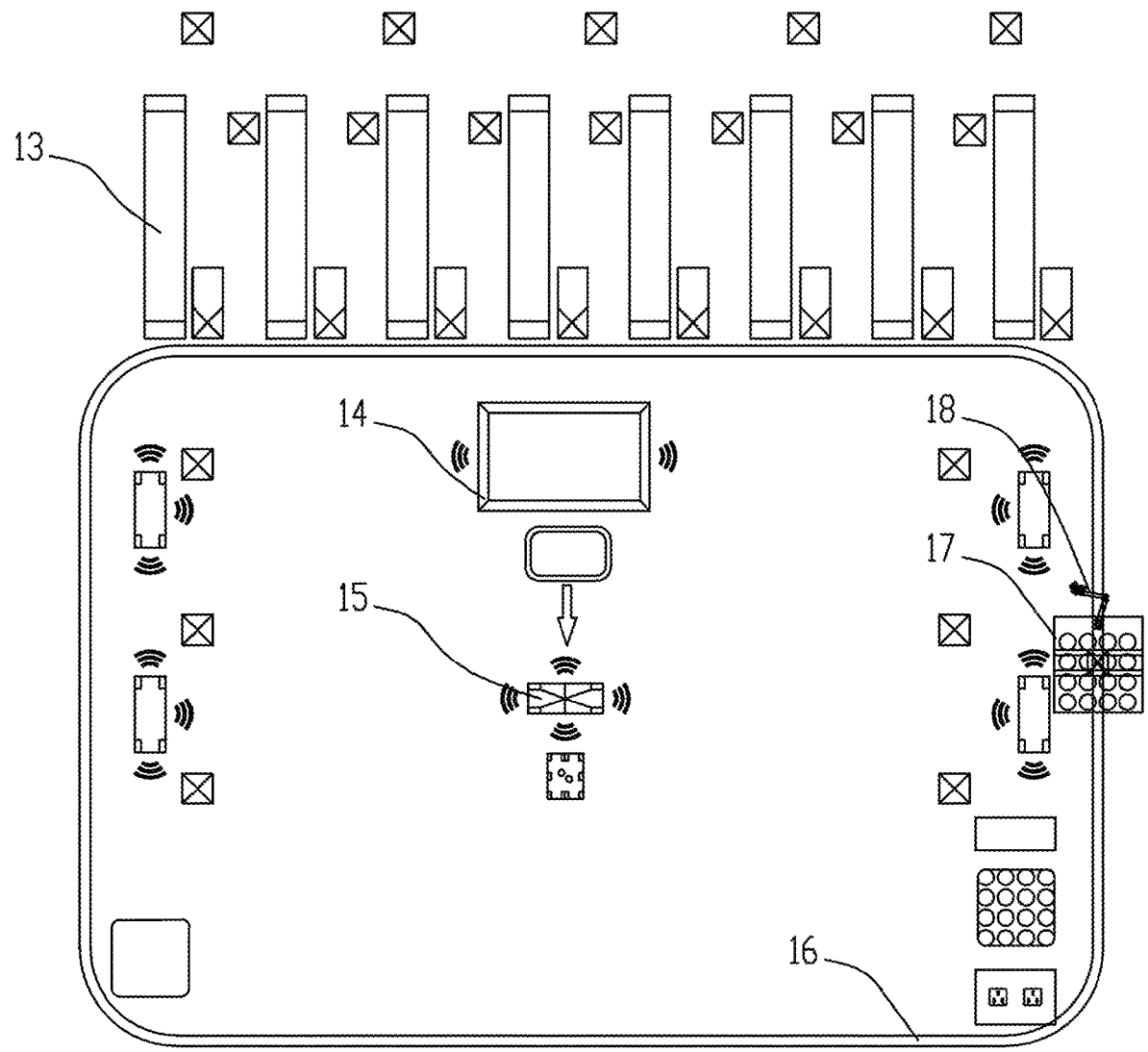
FIG. 11 is a schematic diagram showing the arrangement of a key track of the present invention.

In preferred solutions shown in FIG. 11, further comprising a sky track 16 on which a transport trolley 17 is arranged, wherein a mechanical arm 18 is arranged on the transport trolley 17 and used to load the base yarns 10 on the transport trolley 17 to the supply zone 7.

Figure 2:
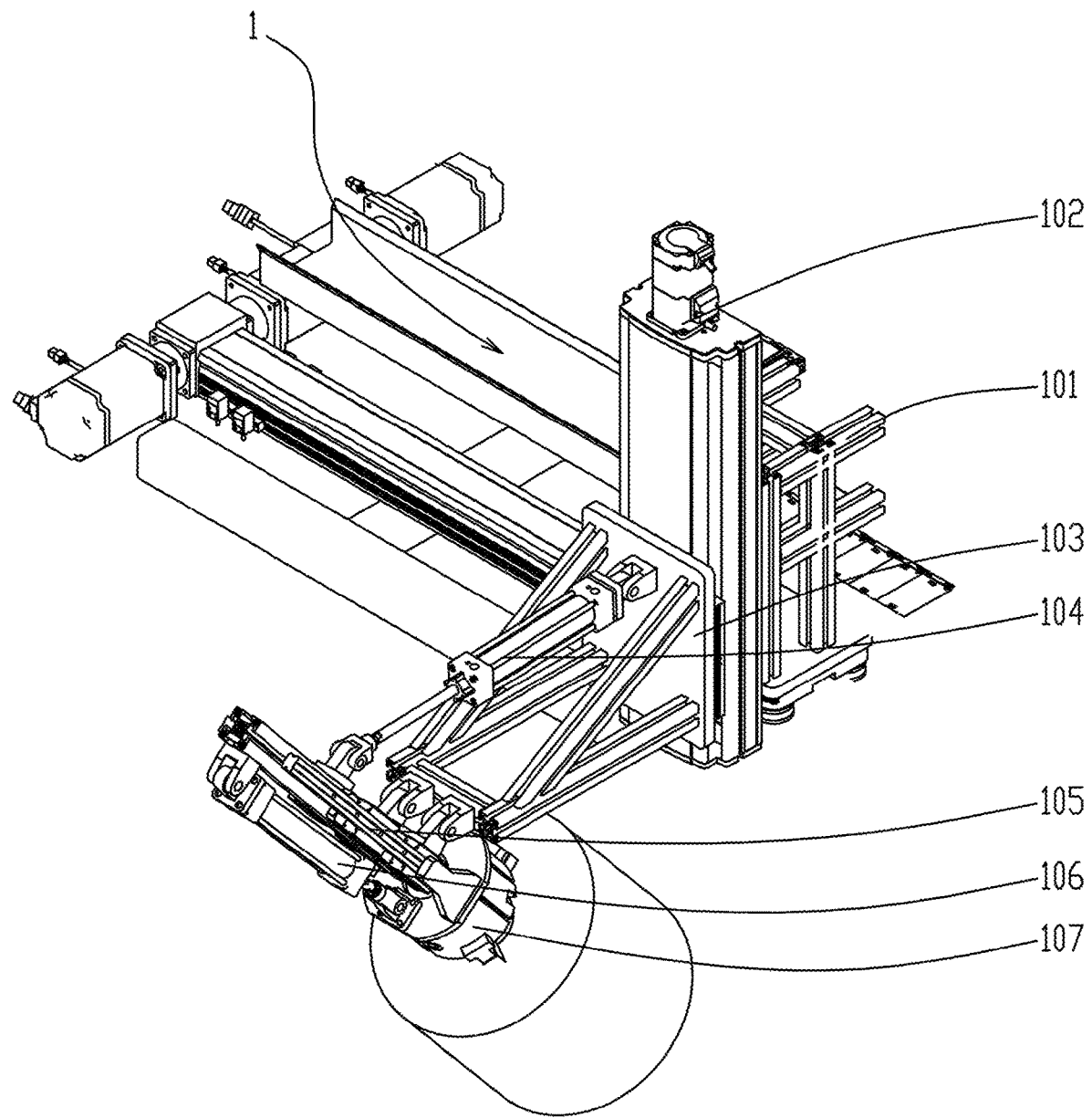
FIG. 2 is a structural schematic diagram of a yarn feeding manipulator of the present invention.

In preferred solutions shown in FIG. 2, the yarn feeding manipulator 1 is structurally characterized in that: a walking trolley 101 is slidably connected to the yarn feeding track 11; a driving device is arranged on the yarn feeding track 11 and used to drive the walking trolley 101 to walk along the yarn feeding track 11; the driving device is a rotating synchronous belt driving device, a fixed synchronous belt driving device or a rack and pinion driving device; With this structure, a walking trolley 101 walks along a yarn feeding track 11 according to instructions of a control cabinet 12.

A rotating synchronous belt driving device is characterized in that a synchronous belt is driven by a motor fixed on the yarn feeding track 11 to rotate, and the synchronous belt drives the walking trolley 101 to walk. A fixed synchronous belt driving device is characterized in that the synchronous belt is fixedly mounted on the yarn feeding track 11, and a driving wheel driven by a motor is arranged on the walking trolley 101 and is engaged with the synchronous belt, thereby driving the walking trolley 101 to walk. A rack and pinion driving device is characterized in that: a rack is fixed on the yarn feeding track 11, a gear driven by the motor is arranged on the walking trolley 101, and the gear is engaged with the rack, thereby driving the walking trolley 101 to walk.

Figure 12:
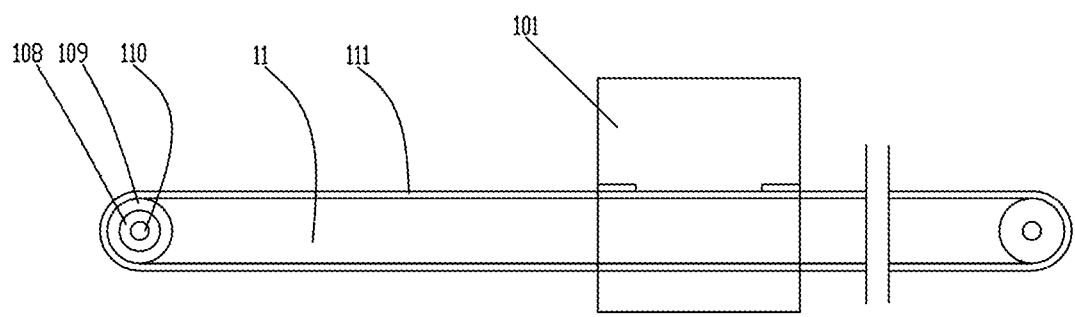
FIG. 12 is a schematic diagram of a driving structure of a walking trolley in the present invention.

In an optional solution shown in FIG. 12, the rotating synchronous belt driving device has a structure similar to a belt mechanism: a trolley motor 108 fixed on the yarn feeding track 11 drives a synchronous belt 111 to rotate, and the synchronous belt 111 drives the walking trolley 101 to walk; an output shaft of the trolley motor 108 or a motor transmission mechanism is provided with a sensor 110 for detecting a motor speed, so as to detect a position of the walking trolley 101.

Figure 13:
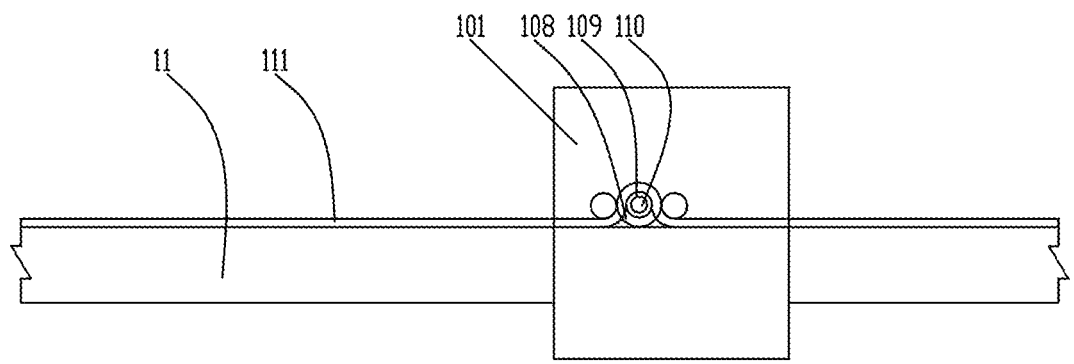
FIG. 13 is a schematic diagram of another preferred driving structure of the walking trolley in the present invention.

In an optional solution shown in FIG. 13, the fixed synchronous belt driving device is characterized in that the synchronous belt 111 is fixedly mounted on the yarn feeding track 11, and a driving wheel 109 driven by the trolley motor 108 is arranged on the walking trolley 101 and is engaged with the synchronous belt 111, thereby driving the walking trolley 101 to walk; and the output shaft of the trolley motor 108 or the driving wheel 109 is provided with a sensor for detecting the motor speed, so as to detect the position of the walking trolley 101.

Figure 14:
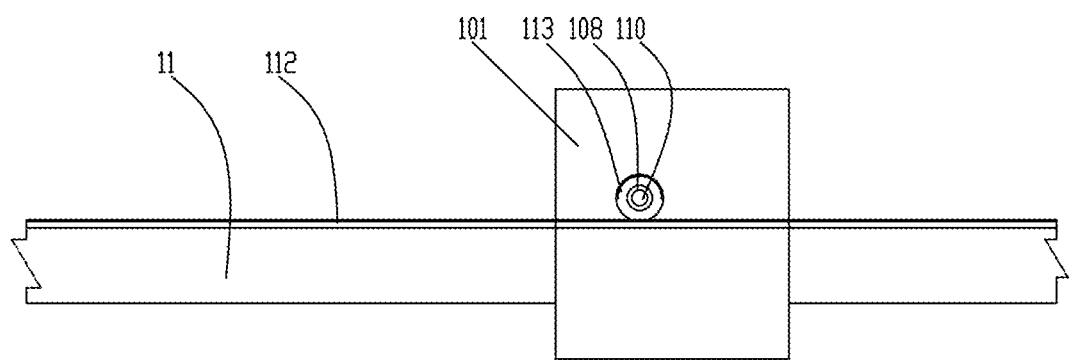
FIG. 14 is a schematic diagram of yet another preferred driving structure of the walking trolley in the present invention.

In an optional solution shown in FIG. 14, the rack and pinion driving device is characterized in that: a rack is fixed on the yarn feeding track 11; a gear 113 driven by the trolley motor 108 is arranged on the walking trolley 101; the gear 113 is engaged with the rack 112, thereby driving the walking trolley 101 to walk; the output shaft of the trolley motor 108 or the motor transmission mechanism is provided with a sensor 110 for detecting the motor speed, so as to detect the position of the walking trolley 101.

A lifting base 103 is connected to the walking trolley 101 through a first lifting mechanism 102, and the first lifting mechanism 102 is an air cylinder or a screw nut mechanism for driving the lifting base 103 to move vertically. In view of such structure, a mechanical claw 107 approaches a yarn feeding creel 2.

An end of the lifting base 103 away from the walking trolley 101 is connected to the claw seat 105 through a deflection cylinder 104, and the deflection cylinder 104 moves along a horizontal line with the claw seat 105 attached to. As shown in FIG. 2, in view of such structure, the axis of the base yarns 10 grabbed by the mechanical claw 107 coincides with the axis of a yarn storage box 21 or a spare spinning position 29.

A mechanical claw 107 is connected to the claw seat 105 through a claw lifting cylinder 106 to drive the mechanical claw 107 to move up and down in a height direction of driving the claw seat 105. By means of such structure, the base yarns 10 grabbed by the mechanical claw 107 fall in the yarn storage box 21 or the spare spinning position 29.

Figure 3:
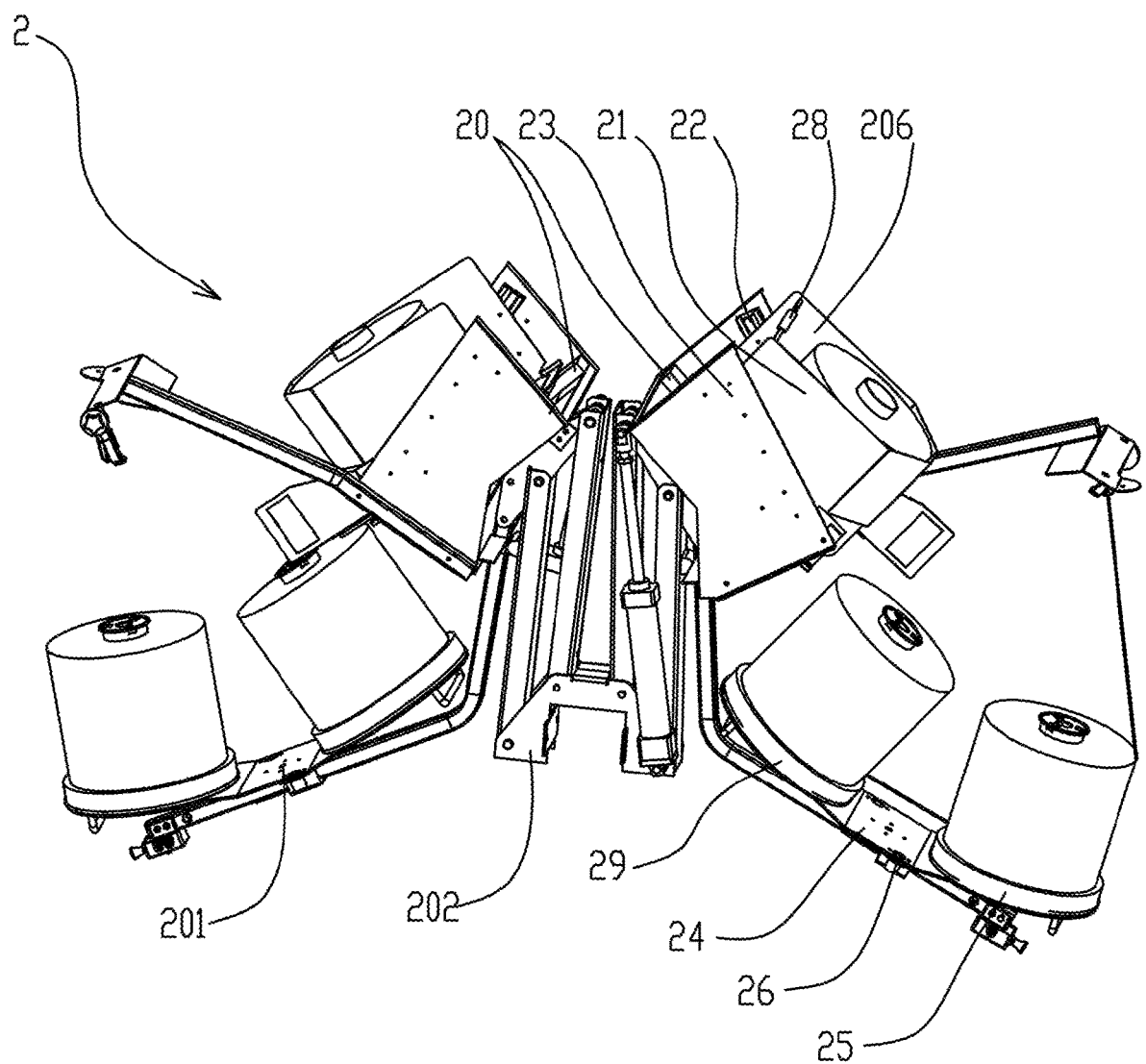
FIG. 3 is a schematic diagram of a front view structure of a yarn feeding creel of the present invention.
Figure 5:
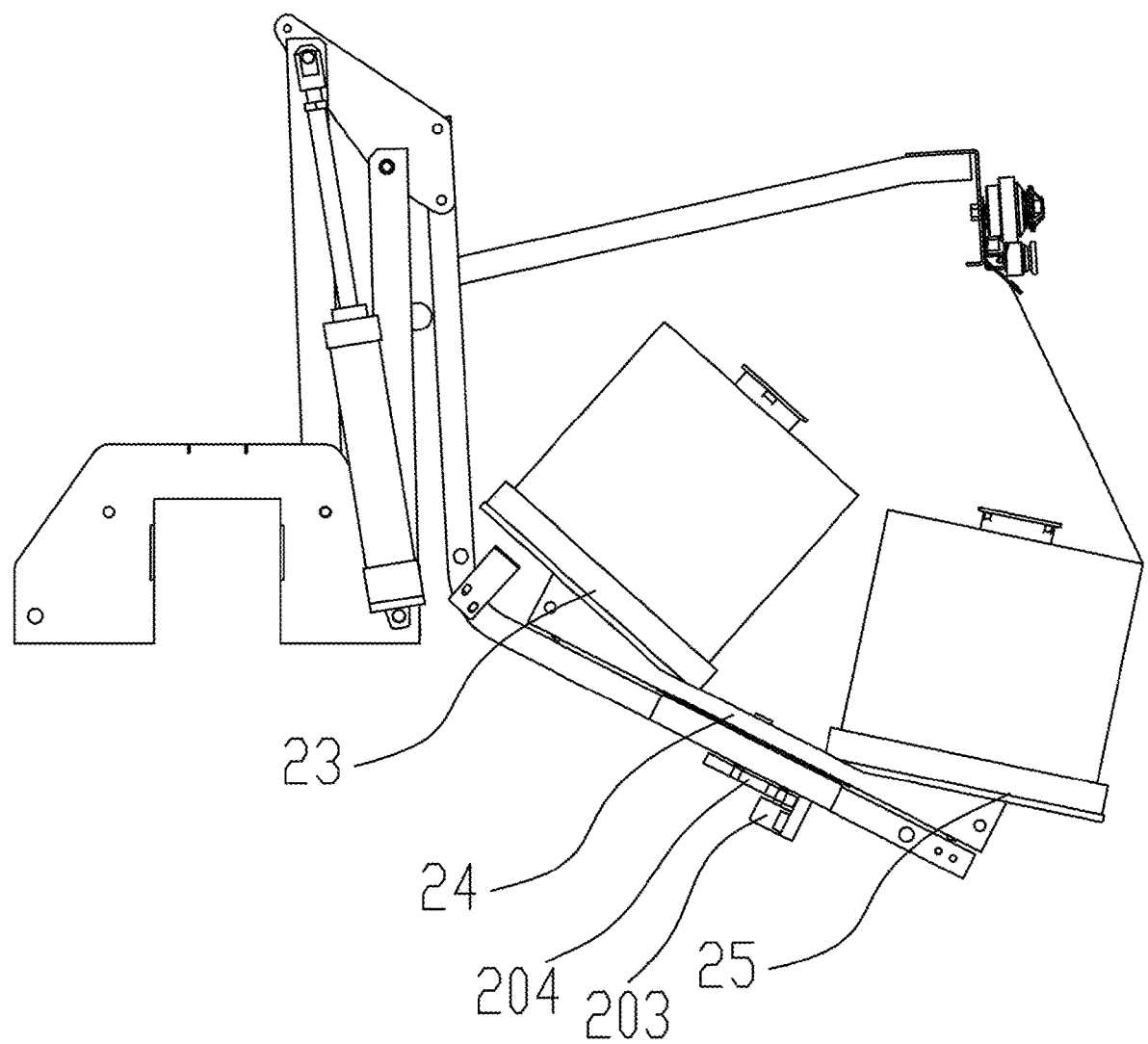
FIG. 5 is a schematic diagram of a front view structure of another optional structure of the yarn feeding creel of the present invention.
Figure 6:
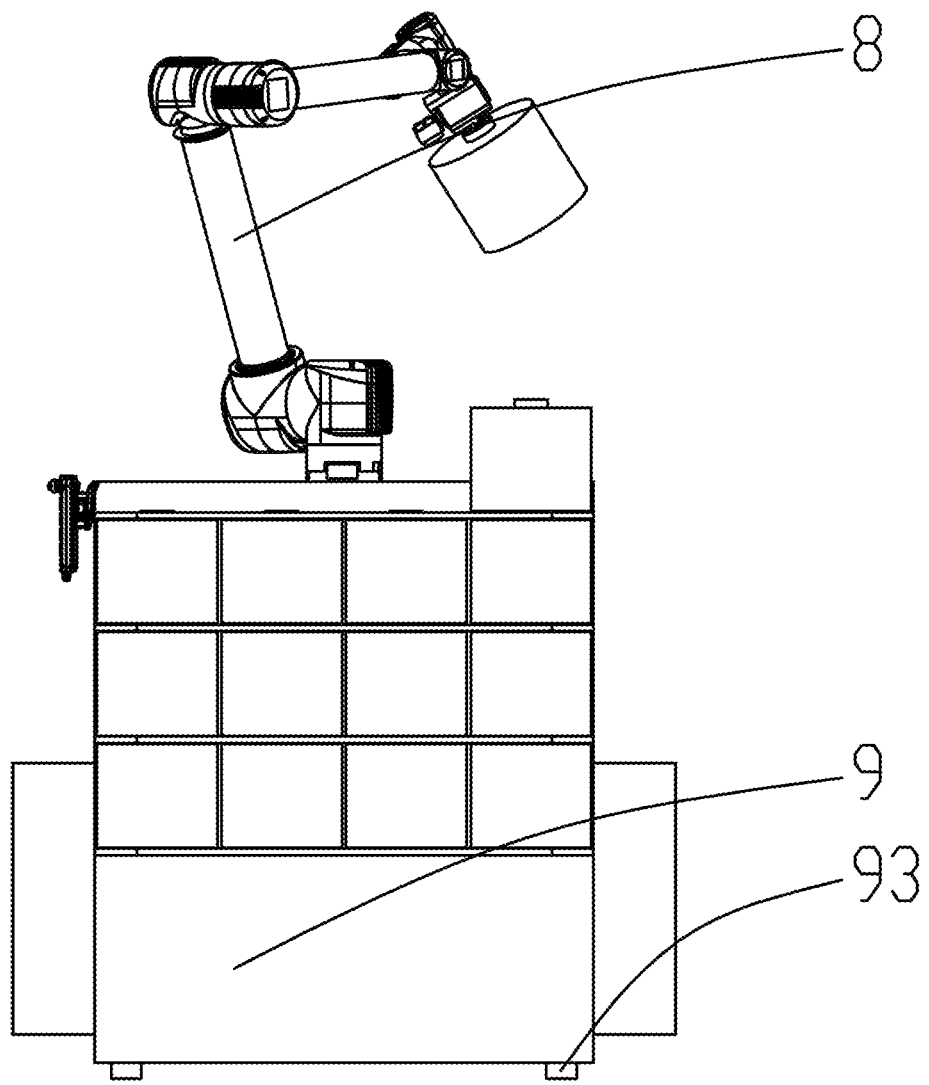
FIG. 6 is a front view of a yarn supply trolley of the present invention.
Figure 7:
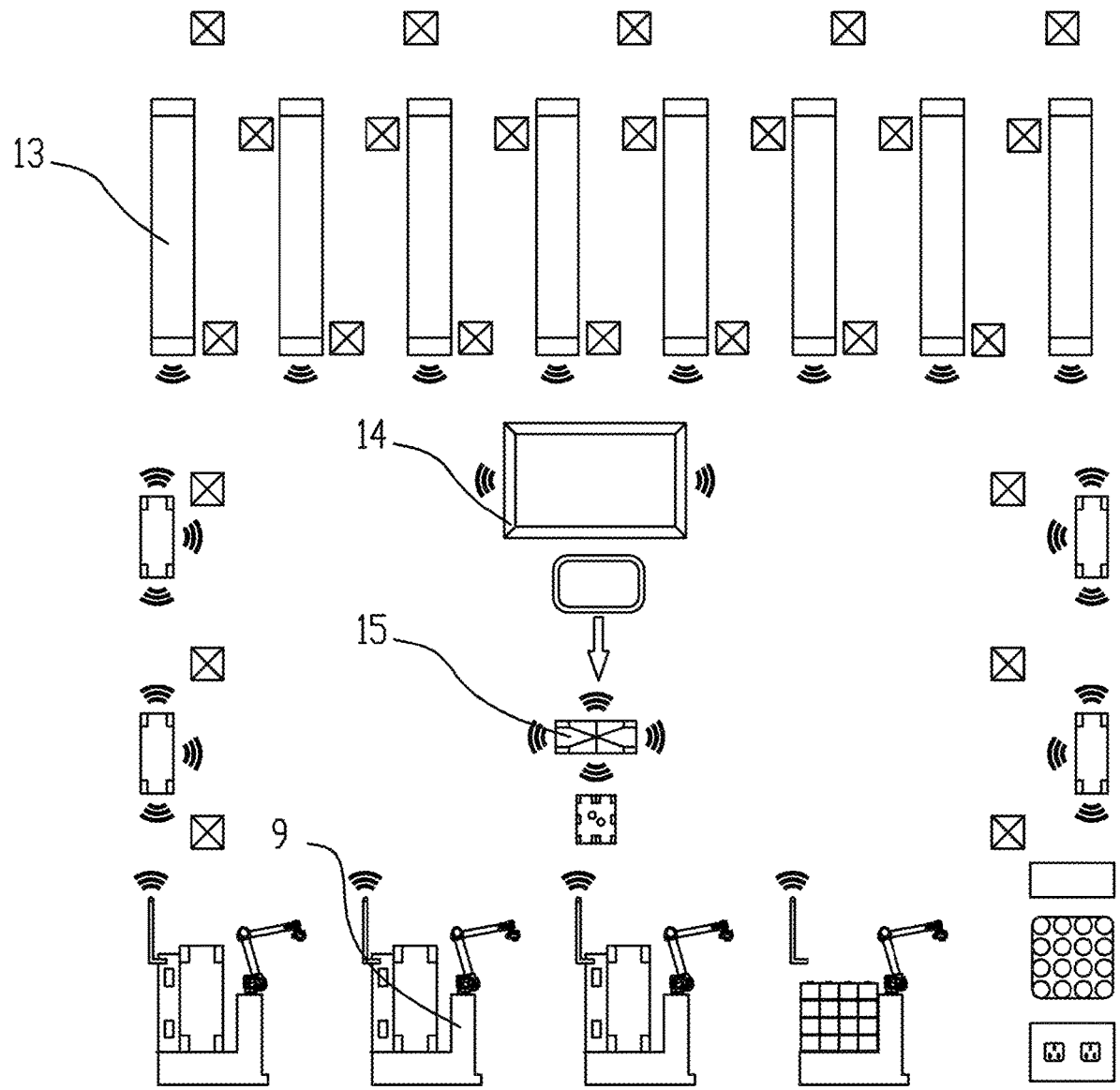
FIG. 7 is a schematic diagram of the overall arrangement of the present invention.

In the preferred solution shown in FIGS. 3 and 5, the rotating frame 24 is connected to an end of the yarn feeding creel 2 through a rotating shaft 201, the rotating shaft 201 is fixedly connected to the rotating frame 24, and the rotating shaft 201 is also connected to a switching motor 203 through a transmission mechanism 204, to drive the rotating frame 24 to rotate automatically. A spinning position 25 and a spare spinning position 29 are provided at both ends of the rotating frame 24. Through the rotation of the rotating frame 24, the positions of the spinning position 25 and the spare spinning position 29 are switched.

As an optional structure, a manual rotation structure may also be adopted. That is, the rotating frame is pivotally connected to the end of the yarn feeding creel 2 through a rotating shaft.

Preferably, a limiting device 26 is arranged between the yarn feeding creel 2 and the rotating frame 24 to limit a rotation angle of the rotating frame 24 to 180°. In this embodiment, the limiting device 26 is a bull's eye spring limiting device.

In a preferred solution as shown in FIG. 1, the yarn feeding creel 2 is provided with a position sensor 3 which is used to detect a position of a yarn feeding manipulator 1. A photoelectric sensor is adopted as the position sensor 3. When the yarn feeding manipulator 1 operates to a position where yarn feeding is required, the position sensor 3 detects the yarn feeding manipulator 1 or detects the base yarns 10 grabbed by the yarn feeding manipulator 1, and then sends a message to the control cabinet 12. The control cabinet 12 controls the yarn feeding manipulator 1 to place the base yarns 10 on the yarn feeding creel 2.

In a preferred solution as shown in FIG. 3, a yarn storage seat 23 is arranged obliquely above the spare spinning position 29 of the yarn feeding creel 2, and the yarn storage seat 23 is closer to the yarn feeding manipulator 1 than the spare spinning position 29.

The yarn storage box 21 is slidably connected to the yarn storage seat 23 through a yarn feeding guide rail 22, and is driven to move vertically by a yarn storage box lifting cylinder 20. A yarn storage box 21 is used to store the base yarns 10. A lower limit position of the yarn storage box 21 is located above the spare spinning position 29. The yarn feeding guide rail 22 is arranged obliquely. The bottom of the yarn feeding guide rail 22 is closer to the direction of the spare spinning position 29.

Figure 4:
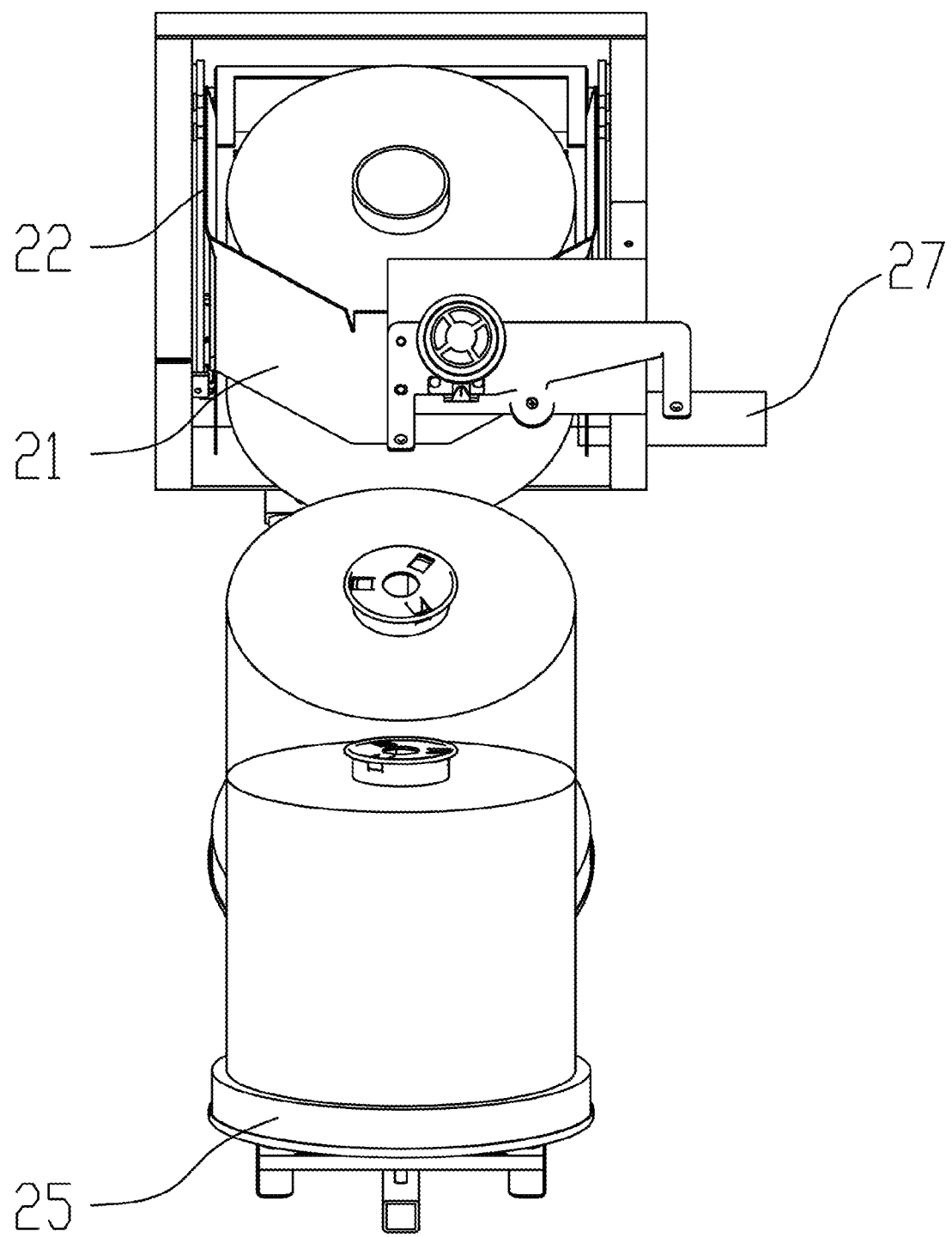
FIG. 4 is a schematic diagram of a right view structure of the yarn feeding creel of the present invention.

In an optional structure as shown in FIG. 1 and FIGS. 3 and 4, a gate 205 which is opened and closed under the driving of a gate cylinder 27 is arranged at the bottom of the yarn storage box 21. When the gate 205 is opened, the base yarns 10 fall in the spare spinning position 29. In view of such structure, the base yarns 10 are supplied from the yarn storage box 21 to the spare spinning position 29. The structure of the provided yarn storage seat 23 and yarn storage box 21 can reduce a working stroke of the yarn feeding manipulator 1 and thereby reduce the volume of the yarn feeding manipulator 1.

In another optional structure as shown in FIG. 3, a side wall 206 of the yarn storage box 21 adopts an elastic structure, such that the side wall 206 of the yarn storage box 21 is contracted enough to clamp the base yarns 10. An unwinding cylinder 28 is arranged between the side walls of the yarn storage box 21 to adjust a distance between the side walls 206 of the yarn storage box 21 on both sides. In an initial state, the distance between the side walls 206 of the yarn storage box 21 on both sides is relatively wide, such that the bottoms of the base yarns 10 are held by the yarn storage seat 23 and cannot fall down after the base yarns 10 are placed by the yarn feeding manipulator 1. However, when the yarns need to be fed to the spare spinning position 29, a piston rod of an unwinding cylinder 28 contracts to shorten the distance between the side walls 206 of the, yarn storage box 2 ion both sides and clamp the base yarns 10, until the yarn storage box 21 descends along the yarn feeding guide rail 22, and leaves the yarn storage seat 23 to reach a position above the spare spinning position 29. The piston rod of the unwinding cylinder 28 then resets. In this embodiment, the unwinding cylinder 28 adopts spring reset. The base yarns 10 drop to the spare spinning position 29 to complete the yarn feeding operation, Therefore, the structure of the solution in this, embodiment is more compact.

Figure 10:
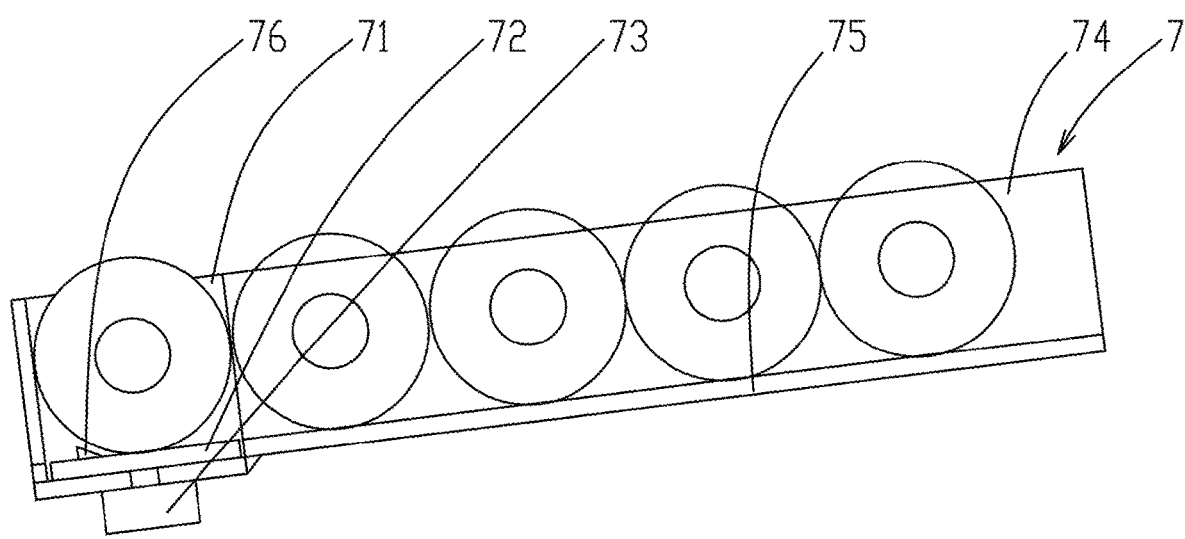
FIG. 10 is a schematic diagram of another preferred structure of a supply zone of the present invention.

In a preferred solution as shown in FIG. 10, the supply zone 7 is structurally characterized in that: side plates 74 are arranged on both sides of the supply zone 7; a conveying belt 19 is arranged at the bottom of the supply zone 7; a buffering position 4 is provided at the tail of the conveying belt 19; a slope is arranged between the buffering position 4 and the tail of the conveying belt 19, so that the base yarns 10 are vertically located on the buffering position 4; a buffer position sensor 6 is provided at the buffering position 4 to detect whether the buffering position 4 has the base yarns 10; and a supply zone sensor 5 is arranged at the tail of the supply zone 7. By means of such structure, it can be ensured that the buffering position 4 always has one base yarn 10. When there is no base yarn 10 in the supply zone 7, the control cabinet 12 sends a yarn feeding request to an industrial control server 14 through a wireless controller 15. The industrial control server 14 arranges an idle yarn supply trolley 9 or a transport trolley 17 along the sky track 16 to transport the base yarns 10 to the twisting machine that sends a request. A photoelectric sensor is adopted as a buffering position sensor 6 and a supply zone sensor 5, respectively.

In another preferred solution as shown in FIG. 10, the supply zone 7 is structurally characterized in that side plates 74 are arranged on both sides of the supply zone 7, a bottom plate 75 is arranged at the bottom of the supply zone 7, and the supply zone 7 is arranged obliquely.

The side plate 74 at the tail of the supply zone 7 is provided with an open yarn take-out port 71 for allowing the base yarns 10 to be taken out. The side plate at the open yarn take-out port 71 is provided with a yarn take-out sensor 76. Preferably, a photoelectric sensor is used as the yarn take-out sensor to detect whether the base yarns 10 exist at the open yarn take-out port 71.

A head-up push plate 72 is arranged on the bottom plate 75 at the yarn take-out port 71. The head-up push plate 72 is connected to a head-up cylinder 73. The head-up cylinder 73 is connected to the head-up push plate 72. The head-up push plate 72 is located near one end of the open yarn take-out port 71. The lifting of the head-up push plate 72 is used to tilt one end of the base yarn 10 close to the open yarn take-out port 71 upward. By means of such structure, the control of the supply zone 7 can be further simplified, and the structure of a conveying belt 19 can be eliminated. In addition, one sensor may be omitted.

A description will be made by taking the optimal embodiment as an example: when in use, the industrial control server 14 sends an instruction to the yarn supply trolley 9 or the transport trolley 17 along the sky track 16 through a wireless controller 15 according to a request of the twisting machine 13. The yarn supply trolley 9 or the transport trolley 17 places a plurality of base yarns 10 in the supply zone 7. The yarn feeding manipulator 1 takes off one base yarn 10 from the buffering position 4 or the open yarn take-out port 71 when running to the supply zone 7, and transports the base yarn 10 to a required spindle position, and the first lifting mechanism 102 acts. Here, a screw nut mechanism is adopted, the lifting base 103 is lowered, the deflection cylinder 104 extends to act, the claw seat 105 inclines, the claw lifting cylinder 106 extends out, and the mechanical claw 107 falls to a position above the yarn storage box 21. The mechanical claw 107 loosens the base yarn 10 and the base yarn 10 falls into the yarn storage box 21. When the base yarn 10 in the spinning position 25 is used up, the manually-driven or motor-driven rotating frame 24 rotates, and the spinning position 25 and the spare spinning position 29 are switched. A bobbin is removed, followed by manual or automatic spinning-in connection. The yarn storage box lifting cylinder 20 extends out, and the yarn storage box 21 moves diagonally downward and is located above the spare spinning position 29. A gate cylinder 27 drives the gate to open, and the base yarn 10 falls on the spare spinning position 29 to complete the intelligent yarn feeding operation.

The above-mentioned embodiments are only the preferred technical solutions of the present invention and should not be regarded as limitations to the present invention. The protection scope of the present invention should be based on the technical solutions described in the claims, including equivalent replacement solutions of the technical features in the technical solutions described in the claims. That is, equivalent replacements and improvements within this scope are also within the protection scope of the present invention. On the premise that there is no conflict with each other, the various technical features in the above-mentioned embodiments can be combined with each other.

What is claimed is:

1. An automatic yarn feeding system for a twisting machine (13) with spindle positions (131), comprising a yarn feeding track (11) arranged on the twisting machine (13), wherein
   the yarn feeding track (11) is arranged in a length direction of the twisting machine (13) and provided with a yarn feeding manipulator (1) walking along the yarn feeding track (11); and
   a supply zone (7) which is arranged on one side of the yarn feeding track (11) and is used to buffer base, yarns (10), wherein the yarn feeding manipulator (1) is used to convey the base yarns (10) from the supply zone (7) to a yarn feeding creel (2) of each spindle position (131),
   the yarn feeding track (11) is located in a middle of a top of the twisting machine (13); and
   the supply zone (7) is provided with a structure for buffering the base yarns (10), and is located on the one side of an end of the yarn feeding track (11) on a top of a control cabinet (12).

2. The automatic yarn feeding system for the twisting machine according to claim 1, further comprising a yarn supply trolley (9), wherein
   an omnidirectional self-propelled base (93) is arranged at a bottom of the yarn supply trolley (9);
   a yarn supply mechanical arm (8) is arranged at a top of the yarn supply trolley (9);
   a camera (83) is arranged on the yarn supply mechanical arm (8); and
   the yarn supply trolley (9) is used to load the base yarns (10) to the supply zone (7).

3. The automatic yarn feeding system for the twisting machine according to claim 2, wherein,
a first manipulator (81) and a second manipulator (82) are arranged at an end of the mechanical arm (8) and used to take off bobbins while feeding the yarns, or take off a plurality of bobbins at a same time.

4. The automatic yarn feeding system for the twisting machine according to claim 1, further comprising a sky track (16) on which a transport trolley (17) is arranged, wherein a mechanical arm (18) is arranged on the transport trolley (17) and used to load the base yarns (10) on the transport trolley (17) to the supply zone (7).

5. The automatic yarn feeding system for the twisting machine according to claim 1, wherein,
the manipulator (1) further comprises a walking trolley (101) which is slidably connected to the yarn feeding track (11); a driving device is arranged on the yarn feeding track (11) and used to, drive the walking trolley (101) to walk along the yarn feeding track (11);
the driving device is a rotating synchronous belt driving device, a fixed synchronous belt driving device or a rack and pinion driving device;
a lifting base (103) is connected to the walking trolley (101) through a first lifting mechanism (102), and the first lifting mechanism (102) is an air cylinder or a screw nut mechanism for driving the lifting base (103) to move vertically;
an end of the lifting base (103) away from the walking trolley (101) is connected to the claw seat (105) through a deflection cylinder (104), the deflection cylinder (104) moves along a horizontal line with the claw seat (105) attached to; and
a mechanical claw (107) is connected to the claw seat (105) through a claw lifting cylinder (106) to drive the mechanical claw (107) to move up and down in a height direction of driving the claw seat (105).

6. The automatic yarn feeding system for the twisting machine according to claim 5, wherein,
the rotating synchronous belt driving device is a device in which; a trolley motor (108) fixed on the yarn feeding track (11) drives a synchronous belt (111) to rotate, and the synchronous belt (111) drives the walking trolley (101) to walk; an output shaft of a trolley motor (108) or a motor transmission mechanism is provided with a sensor (110) for detecting a motor speed, so as to detect a position of the walking trolley (101).

7. The automatic yarn feeding system for the twisting machine according to claim 5, wherein,
the fixed synchronous belt driving device is a device in which: a synchronous belt (111) is fixedly mounted on the yarn feeding track (11), and a driving wheel (109) driven by a trolley motor (108) is arranged on the walking trolley (101) and is engaged with the synchronous belt (111), thereby driving the walking trolley (101) to walk; and an output shaft of the trolley motor (108) or the driving wheel (109) is provided with a sensor (110) for detecting a motor speed, so as to detect a position of the walking trolley (101).

8. The automatic yarn feeding system for the twisting machine according to claim 5, wherein,
the rack and pinion driving device is a device in which: a rack is fixed on the yarn feeding track (11); a gear (113) driven by a trolley motor (108) is arranged on the walking trolley (101); the gear (113) is engaged with the rack (112), thereby driving the walking trolley (101) to walk; an output shaft of the trolley motor (108) or a motor transmission mechanism is provided with a sensor (110) for detecting the motor speed, so as to detect the position of the walking trolley (101).

9. The automatic yarn feeding system for the twisting machine according to claim 1, wherein,
in the yarn feeding creel (2): a rotating frame (24) is connected to an end of the yarn feeding creel (2) through a rotating shaft (201); the rotating shaft (201) is fixedly connected to the rotating frame (24); the rotating shaft (201) is also connected to a switching motor (203) through a transmission mechanism (204), to drive the rotating frame (24) to automatically rotate; and
one end of the rotating frame (24) close to an inner side is a spare spinning position (29), and a other end of the rotating frame (24) is a spinning position (25).

10. The automatic yarn feeding system for the twisting machine according to claim 9, wherein,
a yarn storage seat (23) is arranged obliquely above the spare spinning position (29) of the yarn feeding creel (2), and the yarn storage seat (23) is closer to the yarn feeding manipulator (1) than the spare spinning position (29);
a yarn storage box (21) is slidably connected to the yarn storage seat (23) through a yarn feeding guide rail (22), and is driven to move vertically by a yarn storage box lifting cylinder (20); the yarn storage box (21) is used to store the base yarns (10); a lower limit position of the yarn storage box (21) is located above the spare spinning position (29);
a gate (205) which is opened and closed under a driving of a gate cylinder (27) is arranged at a bottom of the yarn storage box (21); and when the gate (205) is opened, the base yarns (10) fall into the spare spinning position (29).

11. The automatic yarn feeding system for the twisting machine according to claim 9, wherein,
a yarn storage seat (23) is arranged obliquely above the spare spinning position (29) of the yarn feeding creel (2), and the yarn, storage seat (23) is closer to the yarn feeding manipulator (1) than the spare spinning position (29);
a yarn storage box (21) is slidably connected to the yarn storage seat (23) through a yarn feeding guide rail (22), and is driven to move vertically by a yarn storage box lifting cylinder (20); the yarn storage box (21) is used to store the base yarns (10); a lower limit position of the yarn storage box (21) is located above the spare spinning position (29);
side walls (206) of the yarn storage box (21) are elastic structures, such that each side wall (206) of the yarn storage box (21) is contracted enough to clamp the base yarns (10); an unwinding cylinder (28) is arranged between the side walls (206) of the yarn storage box (21) to adjust a distance between the side walls of the yarn storage box (21) at both sides.

12. The automatic yarn feeding system for the twisting machine according to claim 1, wherein,
the yarn feeding creel (2) is a structure in that: a rotating frame (24) is pivotally connected to an end of the yarn feeding creel (2) through a rotating shaft (201);
one end of the rotating frame (24) close to an inner side is a spare spinning position (29), and a other end of the rotating frame (24) is a spinning position (25).

13. The automatic yarn feeding system for the twisting machine according to claim 12, wherein,
a yarn storage seat (23) is arranged obliquely above the spare spinning position (29) of the yarn feeding creel (2), and the yarn storage seat (23) is closer to the yarn feeding manipulator (1) than the spare spinning position (29);

a yarn storage box (21) is slidably connected to the yarn storage seat (23) through a yarn feeding guide rail (22), and is driven to move vertically by a yarn storage box lifting cylinder (20); the yarn storage box (21) is used to store the base yarns (10); a lower limit position of the yarn storage box (21) is located above the spare spinning position (29);

a gate (205) which is opened and closed under a driving of a gate cylinder (27) is arranged at a bottom of the yarn storage box (21); and when the gate (205) is opened, the base yarns (10) falls into the spare spinning position (29).

14. The automatic yarn feeding system for the twisting machine according to claim 12, wherein, a yarn storage seat (23) is arranged obliquely above the spare spinning position (29) of the yarn feeding creel (2), and the yarn storage seat (23) is closer to the yarn feeding manipulator (1) than the spare spinning position (29);

a yarn storage box (21) is slidably connected to the yarn storage seat (23) through a yarn feeding guide rail (22), and is driven to move vertically by a yarn storage box lifting cylinder (20); the yarn storage box (21) is used to store the base yarns (10); a lower limit position of the yarn storage box (21) is, located above the spare spinning position (29);

side walls (206) of the yarn storage box (21) are elastic structures, such that each side wall (206) of the yarn storage box (21) is contracted enough to clamp the base yarns (10); an unwinding cylinder (28) is arranged between the side walls of the yarn storage box (21) to adjust a distance between the side walls (206) of the yarn storage box (21) at both sides.

15. The automatic yarn feeding system for the twisting machine according to claim 12, wherein, a limiting device (26) is arranged between the yarn, feeding creel (2) and the rotating frame (24) to limit a rotation angle of the rotating frame (24) to 180°.

16. The automatic yarn feeding system for the twisting machine according to claim 1, wherein, a position sensor (3) is arranged on the yarn feeding creel (2) at each spindle position, and used to detect a position of the yarn feeding manipulator (1).

17. The automatic yarn feeding system for the twisting machine according to claim 1, wherein, the supply zone (7) is a structure in that: side plates (74) are arranged on both sides of the supply zone (7); a conveying belt (19) is arranged at a bottom of the supply zone (7); a buffering position (4) is provided at a tail of the conveying belt (19); a slope (77) is arranged between the buffering position (4) and the tail of the conveying belt (19), so that the base yarns (10) are vertically located on the buffering position (4); a buffer position sensor (6) is provided at the buffering position (4) to detect whether the buffering position (4) has the base yarns (10); and a supply zone sensor (5) is arranged at a tail of the supply zone (7).

18. The automatic yarn feeding system for the twisting machine according to claim 1, wherein, the supply zone (7) is a structure in that: side plates (74) are arranged at both sides of the supply zone (7); a bottom plate (75) is arranged at a bottom of the supply zone (7); the supply zone (7) is arranged obliquely;

the side plate (74) at a tail of the supply zone (7) is provided with an open yarn take-out port (71) for allowing the base yarns (10) to be taken out; the side plate at the open yarn take-out port (71) is provided with a yarn take-out sensor (76) for detecting whether the base yarns (10) exist at the open yarn take-out port (71);

a head-up push plate (72) is arranged on the bottom plate (75) at the yarn take-out port (71): the head-up push plate (72) is connected to a head-up cylinder (73); the head-up cylinder (73) is connected to the head-up push plate (72); the head-up push plate (72) is located near one end of the open yarn take-out port (71); and the lifting of the head-up push plate (72) is used to tilt one end of the base yarn (10) close to the open yarn take-out port (71) upward.

* * * * *